(12) United States Patent
Suzuki (10) Patent No.: US 7,507,906 B2
(45) Date of Patent: Mar. 24, 2009

(54) FLAT CABLE CLAMP

(75) Inventor: Kaoru Suzuki, Kosai (JP)

(73) Assignee: Yazaki Corporation, Tokyo (JP)

( * ) Notice: Subject to any disclaimer, the term of this patent is extended or adjusted under 35 U.S.C. 154(b) by 205 days.

(21) Appl. No.: 11/473,080

(22) Filed: Jun. 23, 2006

(65) Prior Publication Data

US 2007/0066101 A1 Mar. 22, 2007

(30) Foreign Application Priority Data

Jul. 20, 2005 (JP) .......................... P2005-209939

(51) Int. Cl.
*H02G 3/04* (2006.01)

(52) U.S. Cl. .................... 174/68.1; 174/68.3; 174/72 A; 174/117 F; 174/135; 248/68.1; 24/458

(58) Field of Classification Search ................ 174/68.1, 174/68.3, 72 A, 72 R, 95–101, 117 F, 117 FF, 174/135, 40 CC; 248/49, 68.1, 71, 73, 74.1, 248/74.2, 74.3; 439/417, 404, 422, 421, 439/310, 877, 99, 405; 24/458, 545

See application file for complete search history.

(56) References Cited

U.S. PATENT DOCUMENTS

| 4,068,912 A | * | 1/1978 | Hudson et al. | .............. 439/405 |
| 4,356,599 A | * | 11/1982 | Larson et al. | .............. 248/74.3 |
| 4,650,925 A | * | 3/1987 | Coldren | ....................... 174/135 |
| 5,937,745 A | * | 8/1999 | Boe | ........................... 174/135 |
| 6,328,592 B1 | * | 12/2001 | Burke et al. | ................ 439/417 |
| 6,561,465 B2 | * | 5/2003 | Kondo | ........................ 248/74.3 |
| 6,575,411 B1 | * | 6/2003 | Serizawa et al. | ............. 248/49 |
| 6,809,257 B2 | * | 10/2004 | Shibuya | ........................ 174/135 |
| 7,273,388 B2 | * | 9/2007 | Kumakura | ................... 439/422 |
| 7,301,101 B2 | * | 11/2007 | Suzuki | ........................ 174/68.1 |

FOREIGN PATENT DOCUMENTS

| JP | 06-275966 A | 9/1994 |
| JP | 2002-078143 A | 3/2002 |
| JP | 2004-319267 A | 11/2004 |
| JP | 2005-332714 A | 12/2005 |
| JP | 2005-332715 A | 12/2005 |
| JP | 2005-333750 A | 12/2005 |
| JP | 2005-343290 A | 12/2005 |
| JP | 2005-348514 A | 12/2005 |

* cited by examiner

*Primary Examiner*—Angel R Estrada
(74) *Attorney, Agent, or Firm*—Sughrue Mion, PLLC (57) ABSTRACT

To provide a flat cable clamp which can easily carry out a mutual engagement operation of members which clamp down a flat cable over preventing flip-flop (i.e., unstable fixing) of the flat cable which is clamped down, on the occasion that a clamp main body 11 and first, second covers 12, 13 of a flat cable clamp 10 are engaged with each other, cable holding-down protrusions 35, 42 press a bridge portion 62 of a flat cable 60 so as for the bridge portion 62 to be bent toward an inner surface of the clamp main body, in its thickness direction. By that means, the flat cable 60 is held down to the inner surface of the clamp main body 11.

4 Claims, 9 Drawing Sheets

FLAT CABLE CLAMP

BACKGROUND OF THE INVENTION

1. Field of the Invention

This invention relates to a flat cable clamp which is used for fixing a flat cable having flexibility such as FFC (i.e., Flexible Flat Cable) and a ribbon electric cable, to a body to be mounted such as a car body panel.

2. Description of the Related Art

As one of a conventional flat cable clamp, such a thing that a flat cable is clamped down by 2 pieces of clamp main bodies and the flat cable is fixed to a printed board, has been known (e.g., see, JP-A-06-275966 publication).

This flat cable clamp is equipped with 2 pieces of clamp main bodies where an opening portion and a convex portion are formed. According to the flat cable clamp, it is configured in such a manner that the flat cable and the printed board are clamped down between respective surfaces of 2 pieces of the clamp main bodies where the opening portions and the convex portions are disposed, and the flat cable is fixed to the printed board by having a fastening member passed through a fixing hole.

In this flat cable clamp, such a situation that a flat cable is clamped down by 2 pieces of clamp main bodies formed separately has to be maintained by use of a fastening member as a separate member, and the number of components, which configure the flat cable clamp, is large. On that account, a configuration of maintaining such a situation that a flat cable is clamped down by 2 pieces of clamp main bodies, without using the fastening member, by disposing, for example, a locking mechanism which is configured by combination of a locking protrusion and a locking hole which can be engaged with the locking protrusion, and so on.

In this regard, however, even in case that the clamp main bodies configured in this manner are adopted, there is need to reduce a gap been a flat cable and a flat surface, so as for a flat cable which is disposed between a flat pressing surface of the clamp main body and a flat printed board (i.e., it stands between a flat surface and a flat surface) not to flip-flop by excessive vibration to generate noised, in case that a flat cable clamp is mounted on a vehicle such as a car. However, by configuring in that manner, there is no choice to reduce an over-stroke of the locking mechanism, on the occasion that 2 pieces of clamp main bodies are engaged with each other, and engagement of 2 pieces of the clamp main bodies becomes difficult. Therefore, there is a room for improvement.

Meanwhile, the over-stroke of the locking mechanism, in case of explaining a case in which the locking mechanism is configured by a locking protrusion and a locking hole which can be engaged with the locking protrusion as an example, means a size of predetermined clearance to be formed between a catching surface which is caught by the locking protrusion among inner peripheral surfaces in which the locking hole is formed, and a catching surface of the locking protrusion which is caught by that catching surface (i.e., a distance between catching surfaces).

SUMMARY OF THE INVENTION

The present invention is made in view of the above-described situation, and its objective is to provide a flat cable clamp which can easily carry out a mutual engagement operation of members for clamping down a flat cable over preventing flip-flop of the flat cable which is clamped down (i.e., unstable fixing).

In order to accomplish the above-mentioned objective, a flat cable clamp of the present invention is characterized by the following (1) through (3).

(1) A flat cable clamp for fixing a flat cable which is equipped with at least 2 pieces of electric wire portions having insulation outer skins for covering a conductor portion and an outer peripheral surface of the conductor portion and further equipped with a bridge portion integrally formed on the insulation outer skin so as to couple those electric wire portions in parallel and couple those insulation outer skins, to a body to be mounted, having, a clamp main body having a locking portion which can be fitted in and attached to the body to be mounted, a cover which can be engaged with the clamp main body so as to clamp down the flat cable between the cover and the clamp main body, a locking mechanism which is disposed between the clamp main body and the cover so as to maintain an engagement situation of the clamp main body and the cover, and at least one cable holding-down protrusion which is formed on an inner surface of one of the clamp main body and the cover for holding down the flat cable to an inner surface of the other of the clamp main body and the cover, characterized in that the at least one cable holding-down protrusion presses the bridge portion in its thickness direction so as for the bridge portion of the flat cable to be bend toward an inner surface of the other of the clam main body and the cover, on the occasion that the clamp main body engages with the cover.

[2] In the flat cable clamp of the above-described configuration (1), an refuge space for allowing bending of the bridge portion is formed between an inner surface of the other of the clamp main body and the cover, and the bridge portion.

[3] In the flat cable clamp of the above described configuration (1) or (2), the locking mechanism has a catching surface which is formed on one of the clamp main body and the cover, and a catching surface which is formed on the other of the clamp main body and the cover for being caught in order to maintain an engagement situation of the clamp main body and the cover, and an over-stroke between the catching surfaces is equivalent to such a distance that an forefront surface of the at least one cable holding-over protrusion moves toward an inner surface of the other of the clamp main body and the cover, in such a situation that the catching surfaces are caught each other and further on the occasion that the clamp main body and the cover are pressed in a direction of clamping down the flat cable.

According to the flat cable clamp of the above-described configuration (1), on the occasion that at least 1 piece of the cable pressing protrusion is engaged with the clamp main body and the cover, the bridge portion is pressed in its thickness direction so as to be bent toward an inner surface of the other of the clamp main body and the cover, and by that means, the flat cable is held down on an inner surface of the other of the clamp main body and the cover, and therefore, flip-flop of the flat cable which is clamped down by the clamp main body and the cover (i.e., unstable fixing) is prevented, and in addition to that, there is no need to reduce an over-stroke of the locking mechanism, and therefore, it is possible to secure an over-stroke necessary for the locking mechanism over suppressing flip-flop of the flat cable, and thus, it is possible to easily carry out an engagement operation of the clamp main body and the cover over clamping down the flat cable.

According to the flat cable clamp of the above-described configuration (2), an refuge space for allowing bending of the bridge portion is formed between an inner surface of the other of the clamp main body and the cover, and the bridge portion, and it is possible to secure an over-stroke which is sufficient for the locking mechanism, and therefore, it is possible to easily carry out an engagement operation of the clamp main body and the cover over clamping down the flat cable.

According to the flat cable clamp of the above-described configuration (3), an over-stroke between the catching surfaces is equivalent to such a distance that an forefront surface of the at least one cable holding-over protrusion moves toward an inner surface of the other of the clamp main body and the cover, in such a situation that the catching surfaces are caught each other and further on the occasion that the clamp main body and the cover are pressed in a direction of clamping down the flat cable, and therefore, it is possible to disposed a desired over-stroke between the catching surfaces, by arbitrarily setting a height of the cable holding-down protrusion.

Furthermore, in the flat cable clamp of the above-described configuration (3), it is possible to disposed a desired over-stroke having a margin between the catching surfaces, by arbitrarily setting a depth (i.e., a depth of the refuge space) from the bridge portion to an inner surface of the other of the clamp main body and the cover as in the above-described configuration (2).

According to the present invention, it is possible to provide a flat cable clamp which can easily carry out a mutual engagement operation of members for clamping down a flat cable over preventing flip-flop of the flat cable which is clamped down (i.e., unstable fixing).

As above, the present invention was explained in a concise manner. Further, details of the present invention will be further clarified by reading through the best mode for carrying out the invention which will be explained below, with reference to accompanying drawings.

DESCRIPTION OF THE PREFERRED EMBODIMENTS

Hereinafter, a preferred embodiment, which relates to the present invention, will be explained in detail on the basis of drawings.

Figure 1:
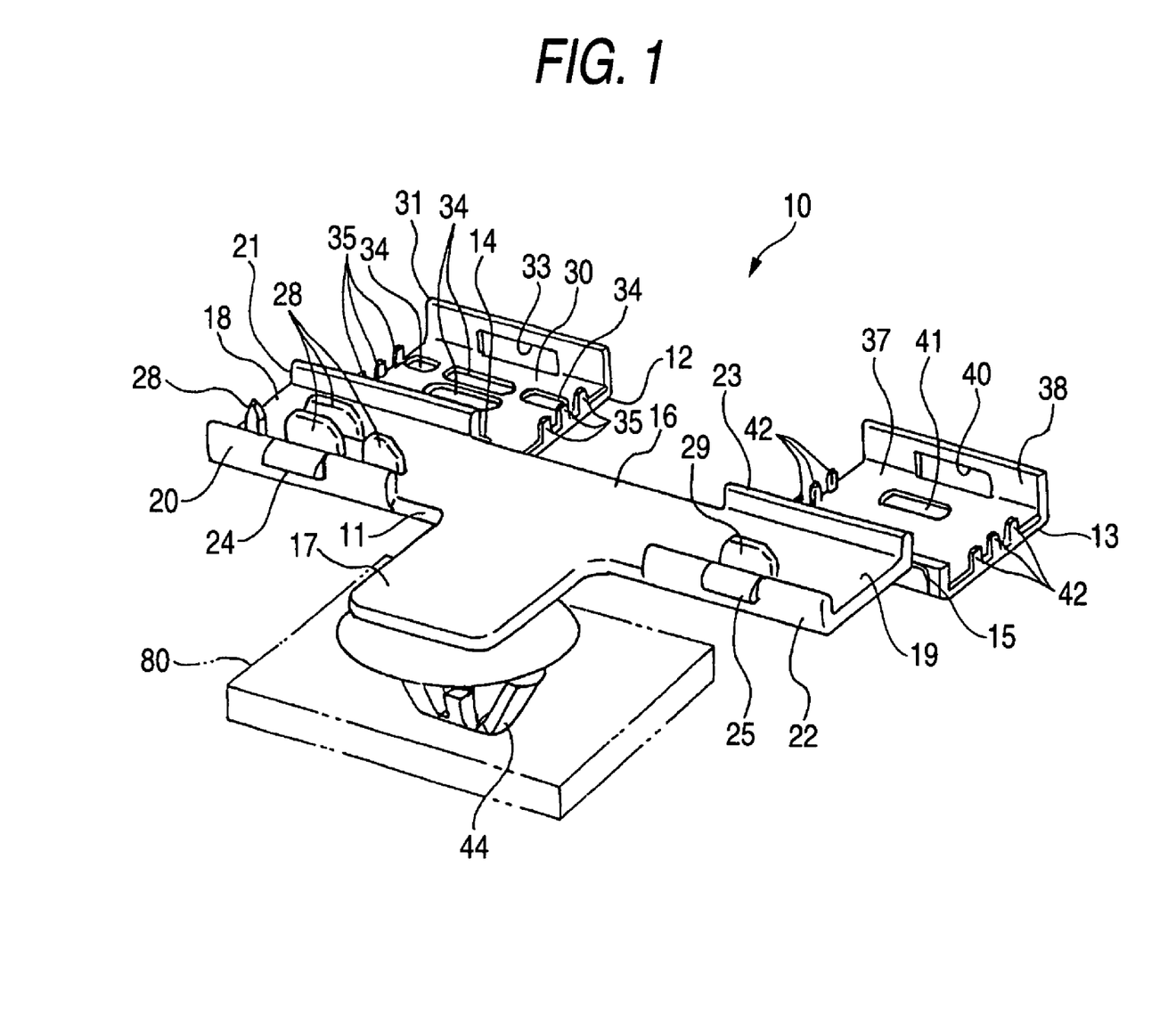
FIG. 1 is an external appearance perspective view which shows one embodiment of a flat cable clamp that relates to the present invention, in such a situation that its clamp main body and covers are expanded.
Figure 2:
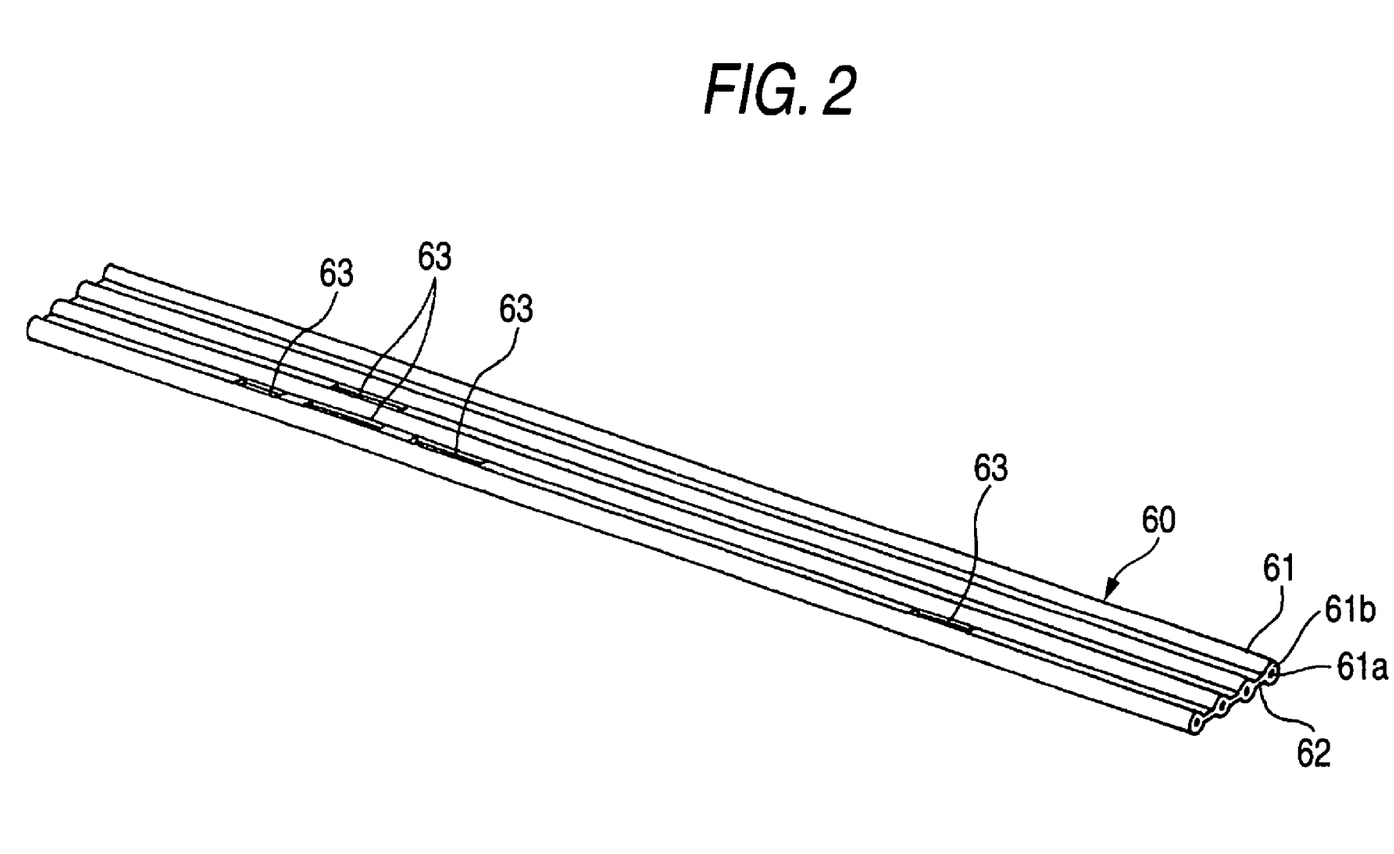
FIG. 2 is an external appearance perspective view of a flat cable which is clamped down by the flat cable clamp of FIG. 1.
Figure 3:
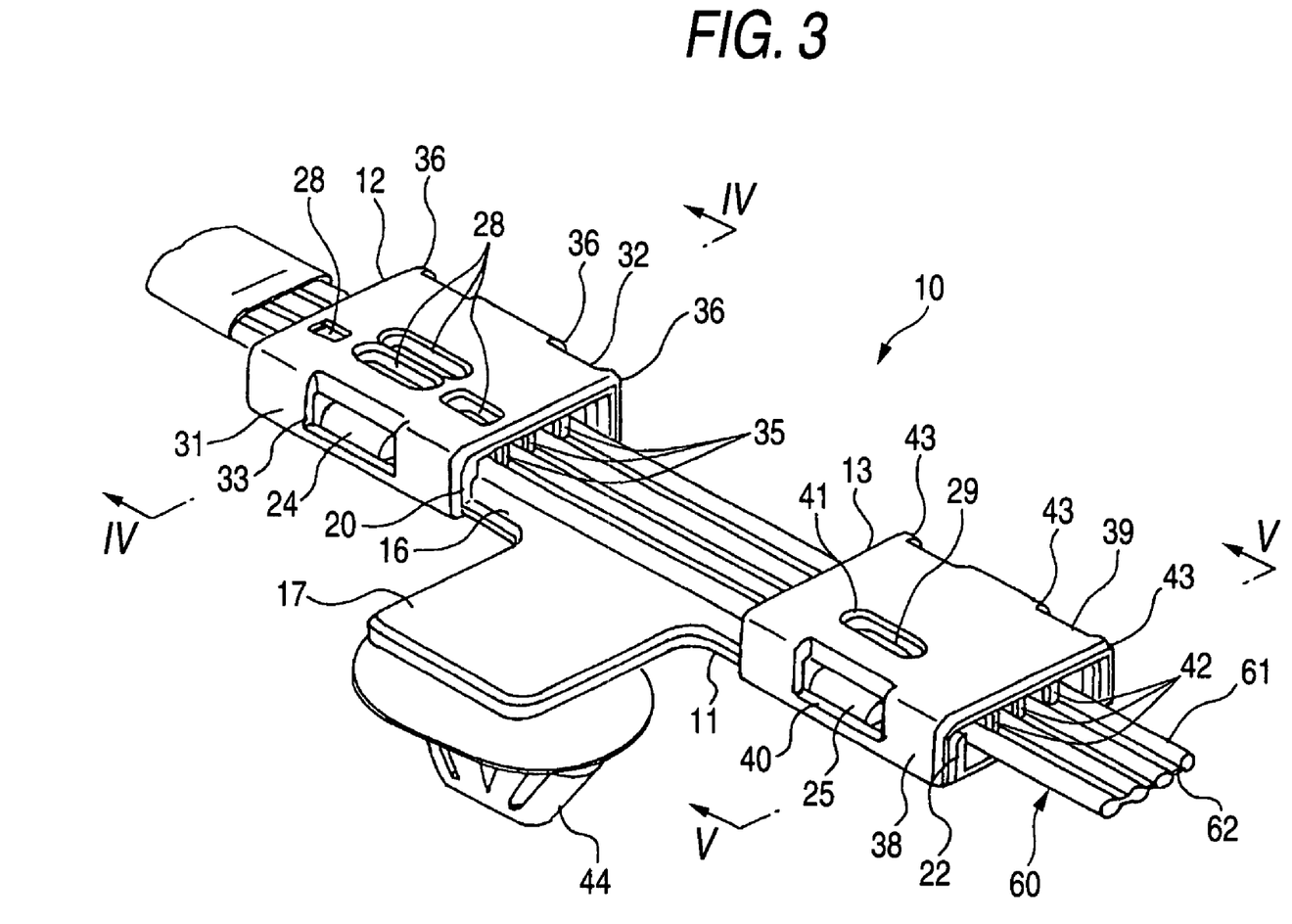
FIG. 3 is an external appearance perspective view which shows such a situation that the flat cable of FIG. 2 is clamped down by the flat cable clamp of FIG. 1.
Figure 4:
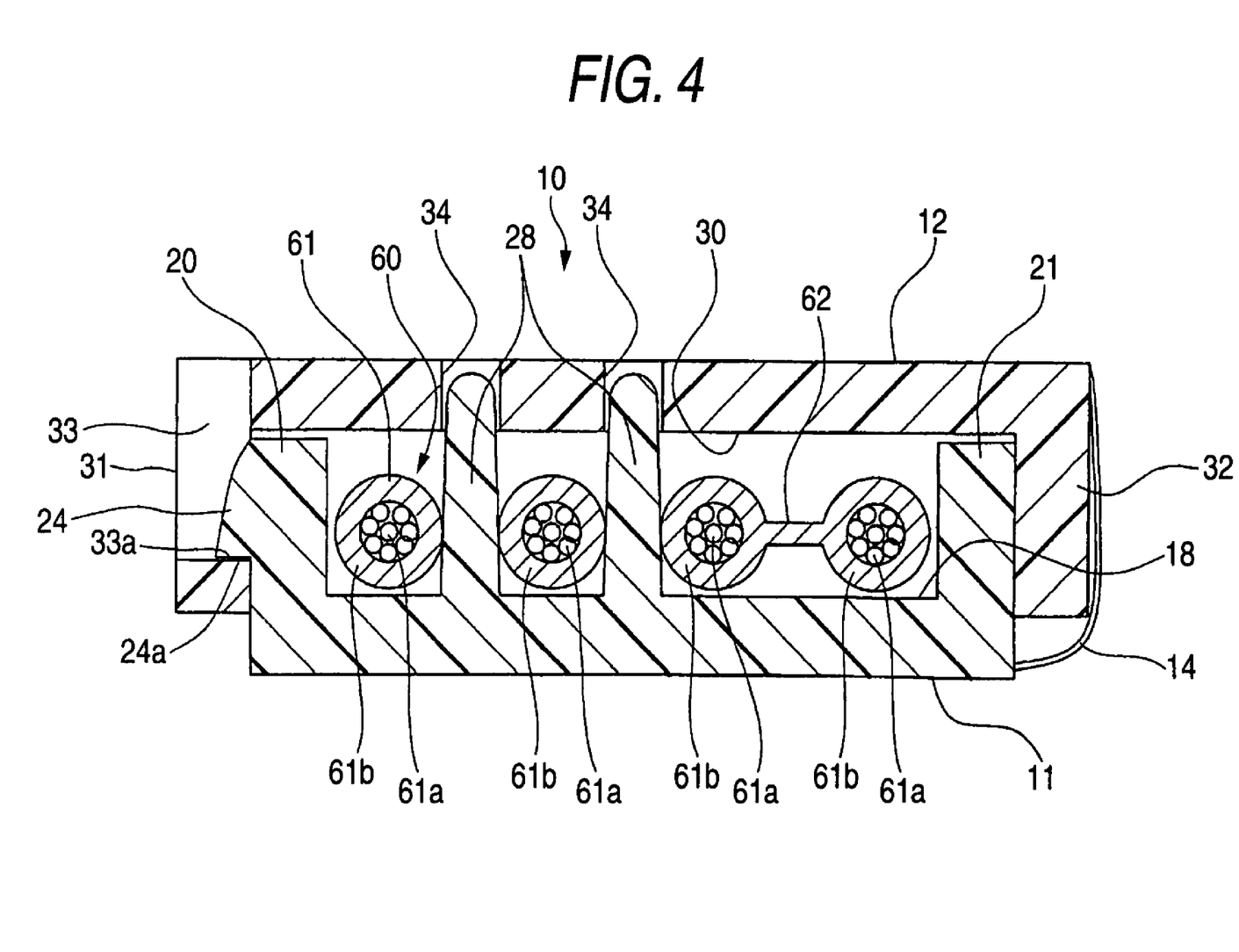
FIG. 4 is a cross sectional view (schematic cross sectional view) viewed from IV-IV arrow of FIG. 3.
Figure 5:
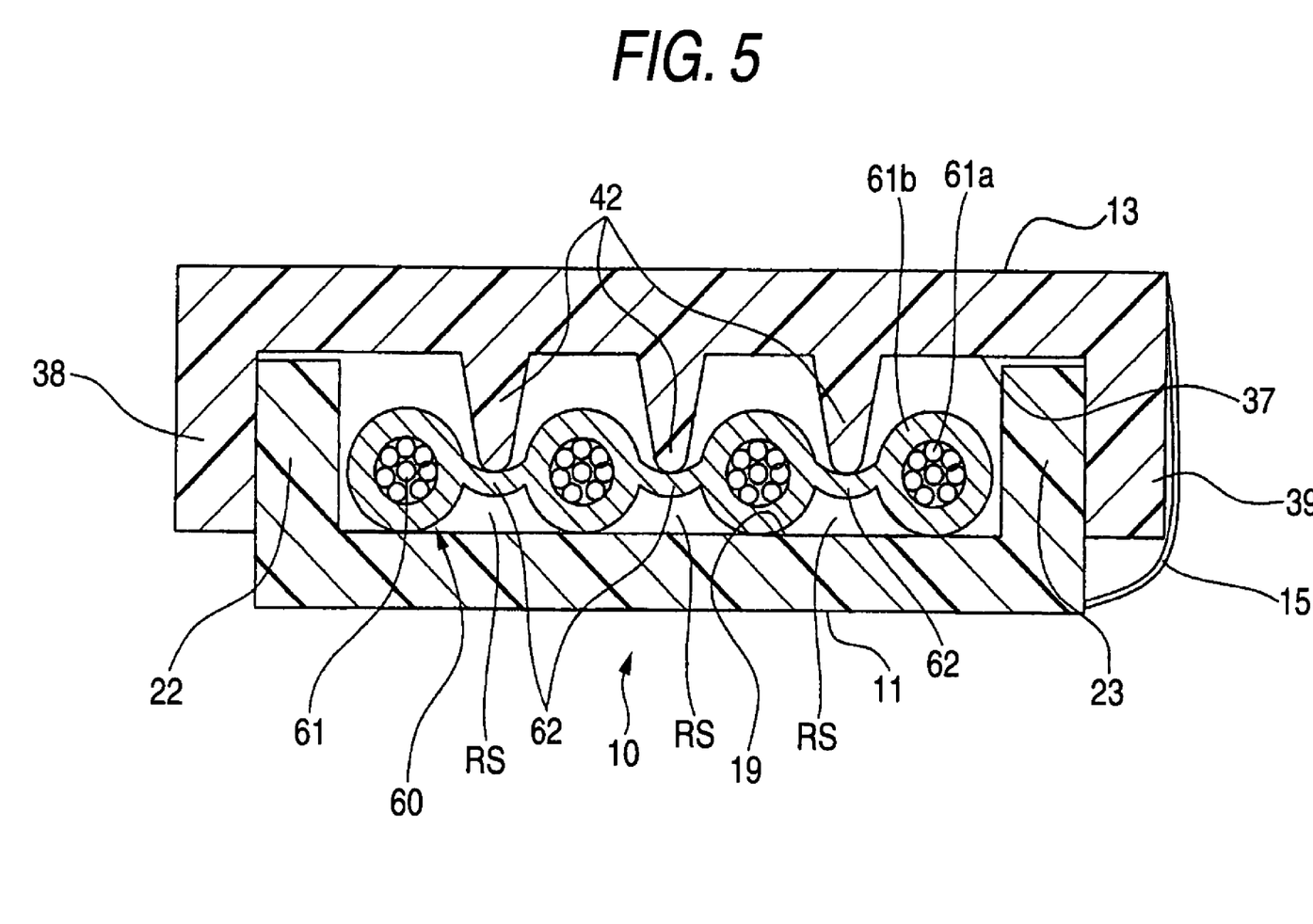
FIG. 5 is across sectional view (schematic cross sectional view) viewed from V-I arrow of FIG. 3.

FIG. 1 is an external appearance perspective view which shows one embodiment of a flat cable clamp that relates to the present invention, in such a situation that its clamp main body and a cover are expanded, and FIG. 2 is an external appearance perspective view of a flat cable which is clamped down by the flat cable clamp of FIG. 1, and FIG. 3 is an external appearance perspective view which shows such a situation that the flat cable of FIG. 2 is clamped down by the flat cable clamp of FIG. 1, and FIG. 4 is a cross sectional view viewed from IV-IV arrow of FIG. 3 (schematic cross sectional view), and FIG. 5 is a cross sectional view viewed from V-V arrow of FIG. 3 (schematic cross sectional view).

As shown in FIGS. 1 through 5, a flat cable clamp 10, which is one embodiment of the present invention, is a flat cable clamp for fixing a flat cable 60, which is equipped with 4 pieces of electric wire portions 61 having conductor portions 61a composed of a plurality of conducting wires and insulation outer skins 61b for covering outer peripheral surface of the conductor portions 61a, and further equipped with bridge portions 61 having flexibility formed integrally with the insulation outer skin 61 respectively, so as to be in parallel to those electric wire portions 61 and to couple between those insulation outer skins 61b (see, FIGS. 2 through 5.), along a body to be mounted such as a car body panel 80 (see, FIG. 1.). Meanwhile, it is all right if the flat cable 60 is equipped with at least 2 pieces of the electric wire portions 61, and thus, it is all right if it is equipped with at least 1 piece of the bridge portion 62.

This flat cable clamp 10 is equipped with a clam main body 11 having a locking portion 44 which can be fitted in and attached to a car body panel 80, first and second covers 12, 13 which can be engaged with the clamp main body 11, first and second thin-walled hinges 14, 15 having flexibility which are formed integrally with the clamp main body 11 and the first, second covers 12, 13 so as to couple the clamp main body 11 and the first, second covers 12, 13 in such a manner that they can be freely swung relatively (see, FIGS. 1, 4 and 5.), a locking mechanism which is disposed between the clamp main body 11 and the first, second covers 12, 13 in order to maintain an engagement situation of the clamp main body 11 and the first, second covers 12, 13 (concretely speaking, combination of locking protrusions 24, 25 and locking holes 33, 40 as shown in FIGS. 1, 3, and 4), and cable holding-down protrusions 35, 42 for pressing a flat cable 60 on first, second fixing surfaces 18, 19 (i.e., inner surfaces) of the clamp main body 11, which are formed on first, second pressing surfaces 30, 37 (i.e., inner surfaces) of the first and second covers 12, 13. As to the first cover 12 and one portion of the clamp main body 11 which is engaged with it and the second cover 13 and another one portion of the clamp main body 11 which is engaged with it, they are simply different in the number and positions of positioning protrusions (28, 29) and the number and positions of protrusion forefront storage portions (34, 41), and equipped with the same configurations as to others.

Meanwhile, in this embodiment, as the locking mechanism, locking protrusions 24, 25 are disposed on the clamp main body 11, and locking holes 33, 40 are disposed in the first and second covers 12, 13, but it is, of course, all right even if it is of such a configuration that the locking protrusions 24, 25 are disposed on the first and second covers 12, 13 and the locking holes 33, 40 are disposed in the clamp main body 11.

In this context, for example, it is all right even if the locking protrusion is disposed on the clamp main body 11 and the locking protrusion 25 is disposed on the second cover 13, or the locking protrusion 25 is disposed on the clamp main body 11 and the locking protrusion 24 is disposed on the first cover 12, and corresponding to them, the locking holes 33, 40 are disposed in any one of the clamp main body 11, the first cover 12, and the second cover 13. In addition, in this embodiment, the cable holding-down protrusions 35, 42 are disposed on the first and second pressing surfaces 30, 37 (i.e., inner surfaces) of the first and second covers 12, 13, but it is, of course, all right even if it is of such a configuration that the cable holding-down protrusions 35, 42 are disposed on the first and second fixing surfaces 18, 19 (i.e., inner surfaces) of the clamp main body 11. In case of disposing the cable holding-down protrusions 35, 42 on the first and second fixing surfaces (i.e., inner surfaces) of the clamp main body 11, it is desirable that the positioning protrusions 28, 29 are disposed on the first and second covers 12, 13, and protrusion forefront storage portions 34, 41 are disposed on the clamp main body 11, to make easy positioning of the flat cable 60 to the flat cable clamp 10. Meanwhile, it is all right even if the flat cable clamp 10 is of such a configuration that only any one of the first and second covers 12, 13 is disposed. Furthermore, it is all right if the number of the cable holding-down protrusions 35, 42 is at least 1 piece.

FIG. 5 shows such a situation that the flat cable 60 of FIG. 2 is clamped down by the second cover 13 and the clamp main body 11 as a representative, a plurality of cable holding-down protrusions 42 (in case of the first cover 12, cable holding-down protrusions 35) press the bridge portions 62 of the flat cable 60, in their thickness directions, so as to be bent toward the second fixing surface 19 of the clamp main body 11 on the occasion that the clamp main body 11 is engaged with the second cover 13 (or first cover 12) (first fixing surface 18 in case of engagement of the first cover 12 and the clamp main body 11), respectively. A refuge space RS for allowing bending of the bridge portion 62 as shown in FIG. 4 is formed between the bridge portion 62 of the flat cable 60, and the second fixing surface 19 of the clamp main body 11 (first fixing surface 18 in case of engagement of the first cover 12 and the clamp main body 11).

FIG. 4 shows such a situation that the flat cable 60 of FIG. 2 is clamped down by the first cover 12 and the clamp main body 11 as a representative. In the locking mechanism in this embodiment, speaking about the first cover 12 and one portion of the clamp main body 11 which is engaged with it, a catching surface 33a which is caught by the locking protrusion 24 among inner surfaces of the first cover 12 in which the locking hole 33 is formed, and a catching surface 24a of the locking protrusion 24 which is caught by that catching surface 33a, are disposed. On the occasion that the clamp main body 11 and the first cover 12 are further pressed in a direction of clamping down the flat cable in such a situation that the catching surface 33a of the first cover 12 is caught by the catching surface 24a of the locking protrusion 24 each other, an over-stroke between the catching surfaces 33a, 24a is equivalent to such a distance that a forefront surface of the cable holding-down protrusion 35 moves toward the first fixing surface 18 of the clamp main body 11. Meanwhile, in this embodiment, also a distance between upper surfaces of a pair of guide plates 20, 21 of the clamp main body 11, and the first pressing surface 30, in such a situation that the first cover 12 is engaged with the clamp main body 11 (see, FIG. 4.) becomes equivalent to the over-stroke between the catching surfaces 33a, 24a.

In the same manner, speaking about the second cover 13 and another one portion of the clamp main body 11 which is engaged with it, in the locking mechanism in this embodiment, a catching surface (there is no reference numerals.) which is caught by the locking protrusion 25 among inner surfaces of the second cover 13 in which the locking hole 40 is formed, and a catching surface (there is no reference numeral.) of the locking protrusion 25 which is caught by that catching surface, are disposed. As shown in FIG. 4, on the occasion that the clamp main body 11 and the second cover 13 are further pressed in a direction of clamping down the flat cable 60 in such a situation that the catching surface of the second cover 13 is caught by the catching surface of the locking protrusion 25 each other, an over-stroke between the catching surfaces is equivalent to such a distance that a forefront surface of the cable holding-down protrusion 42 moves toward the second fixing surface 19 of the clamp main body 11. Meanwhile, in this embodiment, also a distance between upper surfaces of a pair of guide plates 22, 23 of the clamp main body 11, and the second pressing surface 37, in such a situation that the second cover 13 is engaged with the clamp main body 11 (see, FIG. 5.) becomes equivalent to the over-stroke between the catching surface of the second cover 13 and the locking protrusion 25.

Details of the flat cable clamp 10 configured in this manner will be explained below.

The above-mentioned clamp main body 11, first and second thin-walled hinges 14, 15, and first and second covers 12, 13 are formed integrally by using synthetic resin as a material, and by this means, the flat cable clamp 10 is formed.

The clamp main body 11 is formed to be of a T-letter shape and be relatively thin, and has a long first plate portion 16 and a short second plate portion 17 which is connected to a center part of the first plate portion 16.

As to the first plate portion 16, its one end portion is formed in the shape of a nearly C-letter viewed from a cross-section surface, and it has a first fixing surface 18 as a bottom surface, and the other end portion is also formed in the shape of a nearly C-letter viewed from across-section surface, and it has a second fixing surface 19 as a bottom surface. The first and second fixing surfaces 18, 19 have pairs of guide plates 20, 21, 22, 23 which are protruded in a vertical direction from both end portions of them. An interval dimension of the guide plates 20, 21 which are extended in parallel to each other, and an interval dimension of the guide plates 22, 23 which are extended in parallel to each other, are slightly larger than a width dimension of the flat cable 60, respectively. A locking protrusion 24, which is used for locking the first cover, is formed on a lateral surface of the guide plate 20 on the side of the second plate portion 17 so as to be protruded therefrom, and a locking protrusion 25, which is used for locking the second cover, is formed on a lateral surface of the guide plate 22 on the side of the second plate portion 17 so as to be protruded therefrom.

4 pieces of positioning protrusions 28, 28, 28, 28 are formed on the fist fixing surface 18 so as to be protruded there from. These positioning protrusions 28, 28, 28, 28 are disposed so as to be in tune with positions of slit-shaped positioning cutouts 63 (see, FIG. 2.) of a bridge portion 62 formed integrally so as to couple electric wire portions 61 in the flat cable 60 at intervals, by using an insulation material such as polyolefin and silicon rubber as a material.

1 piece of a positioning protrusion 29 is formed on the second fixing surface 19 so as to be protruded therefrom. The positioning protrusion 29 is disposed so as to be in tune with a position of a slit-shaped positioning cutout 63 (see, FIG. 2.) of the bridge portion 62 of the flat cable 60.

The first cover 12 has a rectangular first pressing surface 30 as a bottom surface, and has a pair of guide plates 31, 32 which are protruded in a vertical direction from its both end portions, and is formed in the form of a nearly C-letter viewed from a cross-section surface. An interval dimension of the guide plates 31, 32, which are protruded in parallel to each other, is slightly larger than an interval dimension of the guide plates 20, 21.

2 pieces of first thin-walled hinges 14 are formed integrally in parallel to each other, between a lateral surface of a base end portion (i.e., a root portion) of the guide plate 32 and a lateral surface of a base end portion (i.e., a root portion ) of the guide plate 21. Meanwhile, an engagement hole 33, which engages with a locking protrusion 24 formed on a lateral surface of the guide plate 20, is formed in the guide plate 31.

4 pieces of protrusion holding portions 34, 34, 34, 34 are formed on the first pressing surface 30 so as to pass through it. The 4 pieces of protrusion holding portions 34, 34, 34, 34 engage with the positioning protrusions 28, 28, 28, 28 on the first fixing surface 18, respectively, on the occasion that the first cover 12 is overlaid on the clamp main body 11. In addition, 3 pieces of electric wire holding-down protrusions 35 are formed on both end portions of the fist pressing surface 30, which is extended in an orthogonal direction to the pair of guide plates 31, 32, corresponding to the number of bridge portions 62 of the flat cable 60.

The second cover 13 is of a configuration which is nearly similar to that of the first cover 12, and has a rectangular second pressing surface 37 as a bottom surface, and has a pair of guide plates 38, 39 which are protruded in a vertical direction from its both end portions, and is formed in the shape of a nearly C-letter viewed from a cross-section surface. An interval dimension of the guide plates 38, 39 which are extended in parallel to each other is slightly larger than an interval dimension of the guide plates 22, 23.

2 pieces of second thin-walled hinges 15 are formed integrally in parallel to each other, between a lateral surface of a base end portion (i.e., a root portion) of the guide plate 39 and a lateral surface of a base end portion (i.e., a root portion) of the guide plate 23. Meanwhile, an engagement hole 40, which engages with a locking protrusion 25 formed on a lateral surface of the guide plate 22, is formed in the guide plate 38.

1 piece of a protrusion holding portion 41 is formed on the second pressing surface 37 so as to pass through it. The protrusion holding portion 41 engages with engage with the positioning protrusion 29 on the second fixing surface 19, on the occasion that the second cover 13 is overlaid on the clamp main body 11. In addition, 3 pieces of electric wire holding-down protrusions 42 are formed on both end portions of the second pressing surface 37, which is extended in an orthogonal direction to the pair of guide plates 38, 39, corresponding to the number of bridge portions 62 of the flat cable 60.

A locking portion 44, which is formed on a lower surface of the second plate portion 17 of the clamp main body 11, engages with a clamp hole (not shown in the figure) formed on the car body panel 80.

As shown in FIG. 2, the flat cable is an electric wire generally called as FFC, in which 4 pieces of electric wire portions 61 are coupled by the bridge portions 62, but it may be a ribbon wire etc., other than FFC. As described above, the slit-shaped positioning cutout 63 is formed in the bridge portion 62. Meanwhile, the number of the electric wire portions 61 is selected according to the number of circuits to be applied, etc.

Next, a method of fixing the flat cable 60 to the flat cable clamp 10 will be described. Firstly, the flat cable 60 is placed on the first and second fixing surfaces 18, 19 of the first plate portion 16. At this time, the positioning protrusions 28, 29 are passed through the positioning cutouts 63 of the bridge portions 62 of the flat cable 60. By this means, the flat cable 60 is positioned in its longitudinal direction, and its width direction (lined-up direction of the electric wire portions 61).

After that, the first and second covers 12, 13 are turned and overlaid on the clamp main body 11 through the first and second thin-walled hinges 14, 15, so as to clamp down the flat cable 60 by the first, second fixing surfaces 18, 19 and the first, second pressing surfaces 30, 37. At this time, the locking hole 33 of the first cover 12 is engaged with the locking protrusion 24 of the guide plate 20, and the locking hole 40 of the second cover 13 is engaged with the locking protrusion 25 of the guide plate 22. In addition, at this time, the positioning protrusions 28, 29 are inserted into the protrusion forefront storage portions 34, 41.

Further, at this time, 6 pieces of the cable holding-down protrusions 35 of the first cover 12 press the bridge portions 62 of the flat cable 60, and hold down the flat cable 60 to the first fixing surface 18 of the clamp main body 11, and 6 pieces of the cable holding-down protrusions 42 of the second cover 13 press the bridge portions 62 of the flat cable 60, and hold down the flat cable 60 to the second fixing surface 19 of the clamp main body 11, and by this means, the flat cable 60 is positioned in the flat cable clamp 10, in its thickness direction, and fixed to the flat cable clamp 10.

Then, the locking portion 44 of the flat cable clamp 10 is fitted in and attached to a clamp hole (not shown in the figure) of the car body panel 80, and thereby, the flat cable 60 is fixed to the car body panel 80.

As explained above, according to the flat cable clamp 10, on the occasion that the clamp main body 11 is engaged with the first and second covers 12, 13, the cable holding-down protrusions 35, 42 press the bridge portion 62 in its thickness direction so as for the bridge portion 62 of the flat cable 60 to be bent toward the first and second fixing surfaces 18, 19 (i.e., inner surfaces) of the clamp main body 11, and by that means, the flat cable 60 is held down on the first and second fixing surfaces 18, 19 (i.e., inner surfaces) of the clamp main body 11, and therefore, flit-flop (i.e., unstable fixing) of the flat cable 60, which is clamped down by the clamp main body 11 and the first, second covers 12, 13, is prevented, and in addition to that, there is no need to reduce an over-stroke necessary for the locking mechanism over suppressing flip-flop of the flat cable 60, and therefore, it is possible to secure an over-stroke necessary for the locking mechanism over suppressing flip-flop of the flat cable 60, and thus, it is possible to easily carry out an engagement operation of the clamp main body 11 and the first, second covers 12, 13 over clamping down the flat cable 60.

In addition, according to the flat cable clamp 10, the refuge space RS for allowing bending of the bridge portion 62 between the first, second fixing surfaces 18, 19 (i.e., inner surfaces) of the clamp main body 11 and the bridge portions 62 is formed, and it is possible to secure an over-stroke which is sufficient for the locking mechanism, and therefore, it is possible to easily carry out an engagement operation of the clamp main body 11 and the first, second covers 12, 13 over clamping down the flat cable 60.

In addition, according to the flat cable clamp 10, an over-stroke between the catching surfaces is equivalent to such a distance that forefront surfaces of the cable holding-over protrusions 35, 42 move toward the first and second fixing surfaces 18, 19 (i.e., inner surfaces) of the clamp main body 11, in such a situation that the catching surfaces of the locking protrusions 24, 25 are caught by the catching surf aces of the guide plates 31, 38 each other and further on the occasion that the clamp main body 11 and the first, second covers 12, 13 are pressed in a direction of clamping down the flat cable 60, and therefore, it is possible to disposed a desired over-stroke between the catching surfaces, by arbitrarily setting heights of the cable holding-down protrusions 35, 42.

In addition, according to the flat cable clamp 10, it is possible to disposed a desired over-stroke having margins between the catching surfaces of the locking protrusions 24, 25 and the catching surfaces of the guide plates 31, 18, by arbitrarily setting a depth (i.e., a depth of the refuge space RS) from lower surfaces of the bridge portions 62 of the flat cable 60 to the first, second fixing surfaces 18, 19 (i.e., inner surfaces) of the clamp main body 11.

Meanwhile, in the flat cable clamp 10, it is possible to dispose a desired over-stroke having margins between the catching surfaces of the locking protrusions 24, 25 and the catching surfaces of the guide plates 31, 18, by arbitrarily setting a distance between upper surfaces of the guide plates 20, 21, 22, 23 of the clamp main body 11 and the first, second pressing surfaces 30, 37 in such a situation that the first, second covers 12, 13 are engaged with the clamp main body 11.

Figure 6:
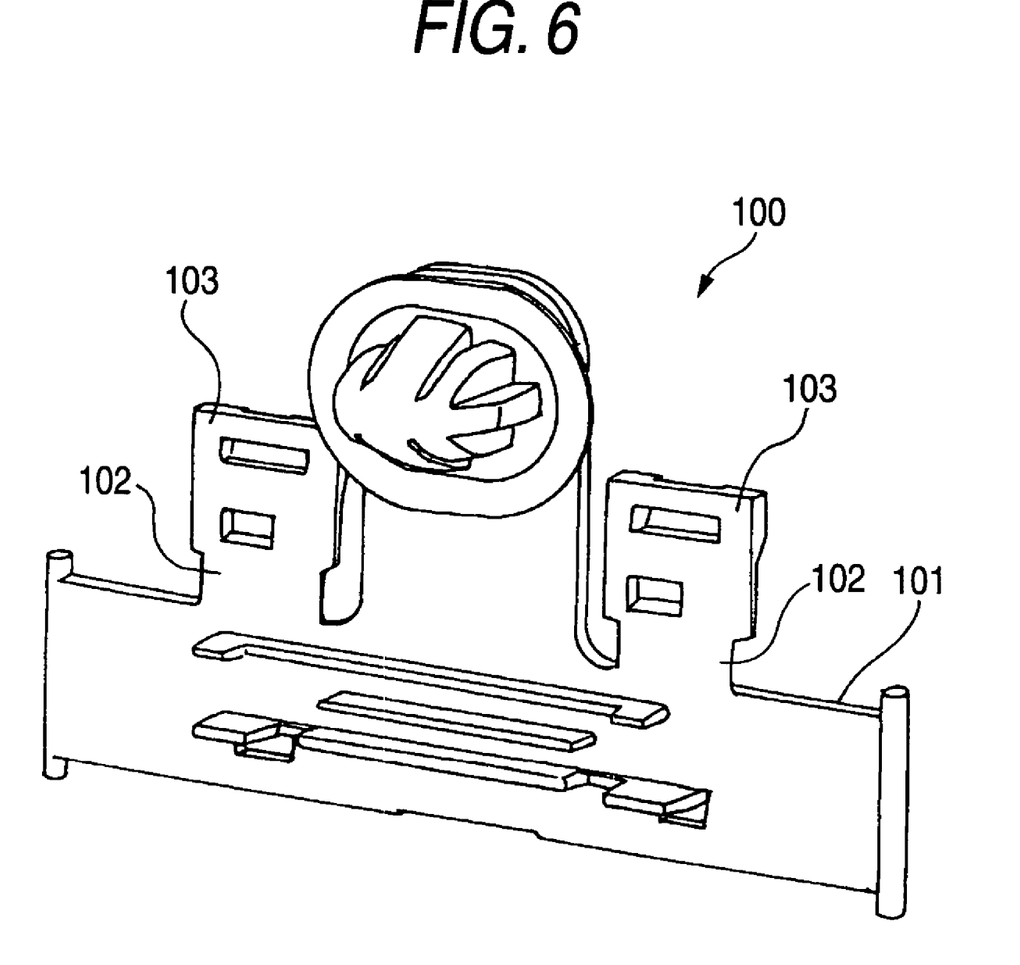
FIG. 6 is an external appearance perspective view which shows a reference example of a flat cable clamp in such a situation that its clamp main body and covers are expanded.
Figure 7:
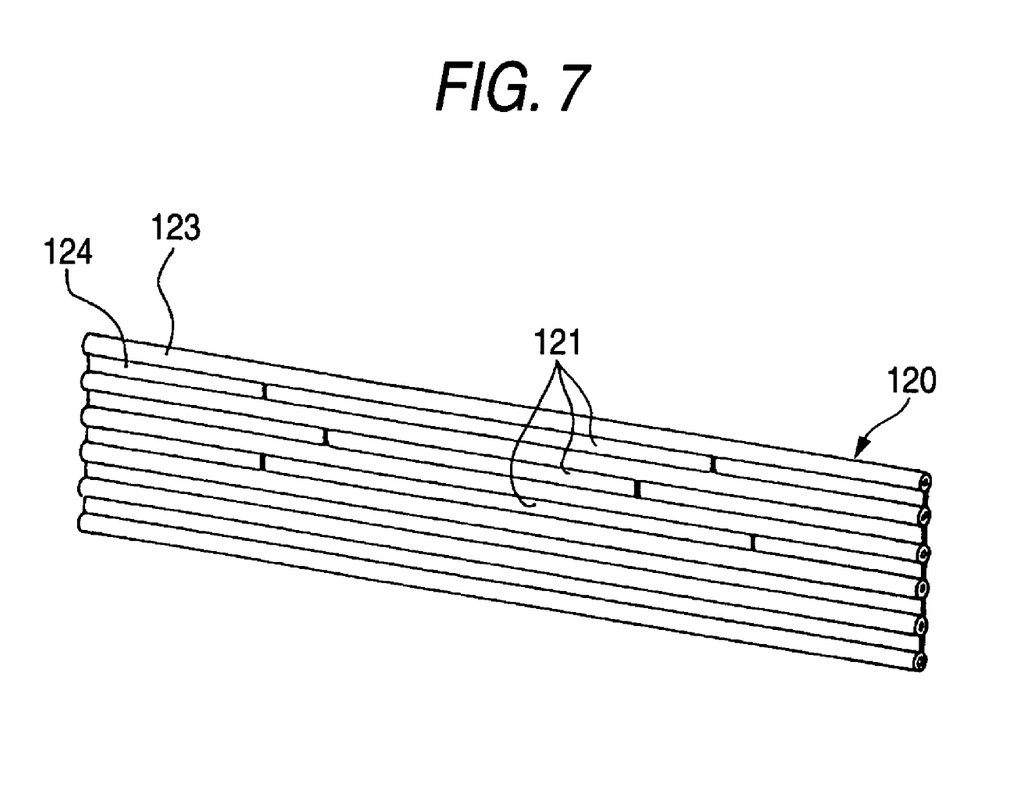
FIG. 7 is an external appearance perspective view of a flat cable which is clamped down by the flat cable clamp of FIG. 6.
Figure 8:
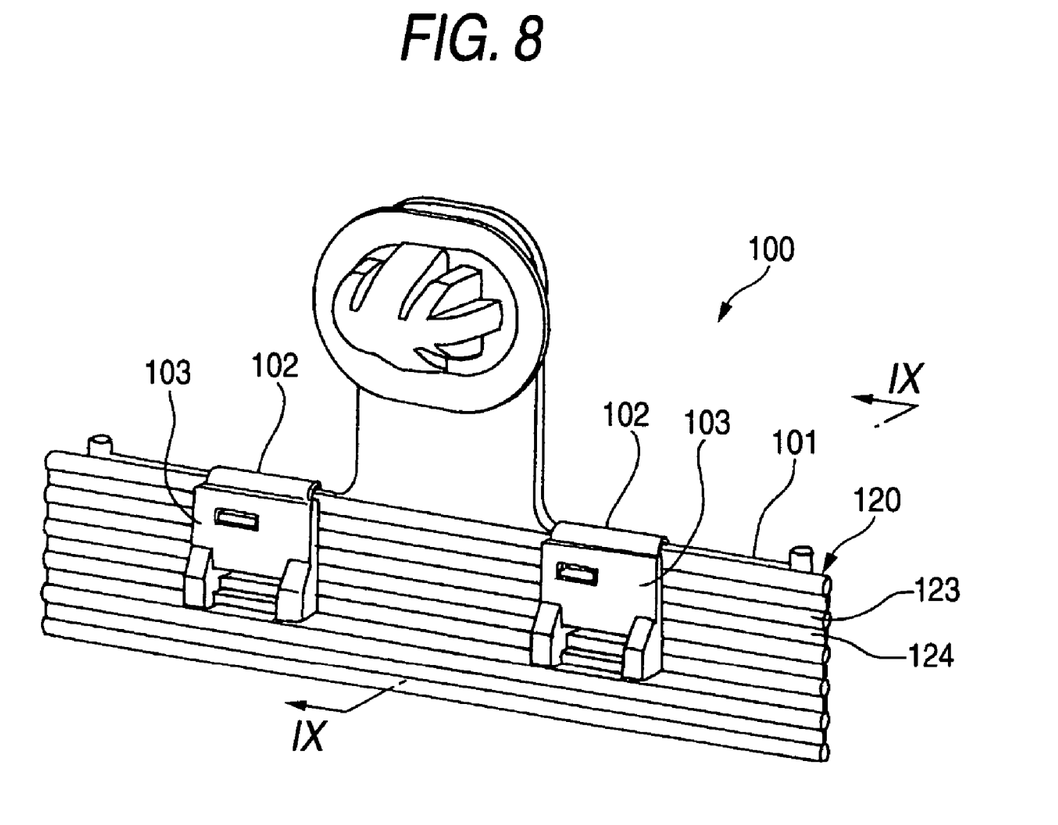
FIG. 8 is an external appearance perspective view which shows such a situation that the flat cable of FIG. 7 is clamped down by the reference example of the flat cable clamp of FIG. 6.
Figure 9:
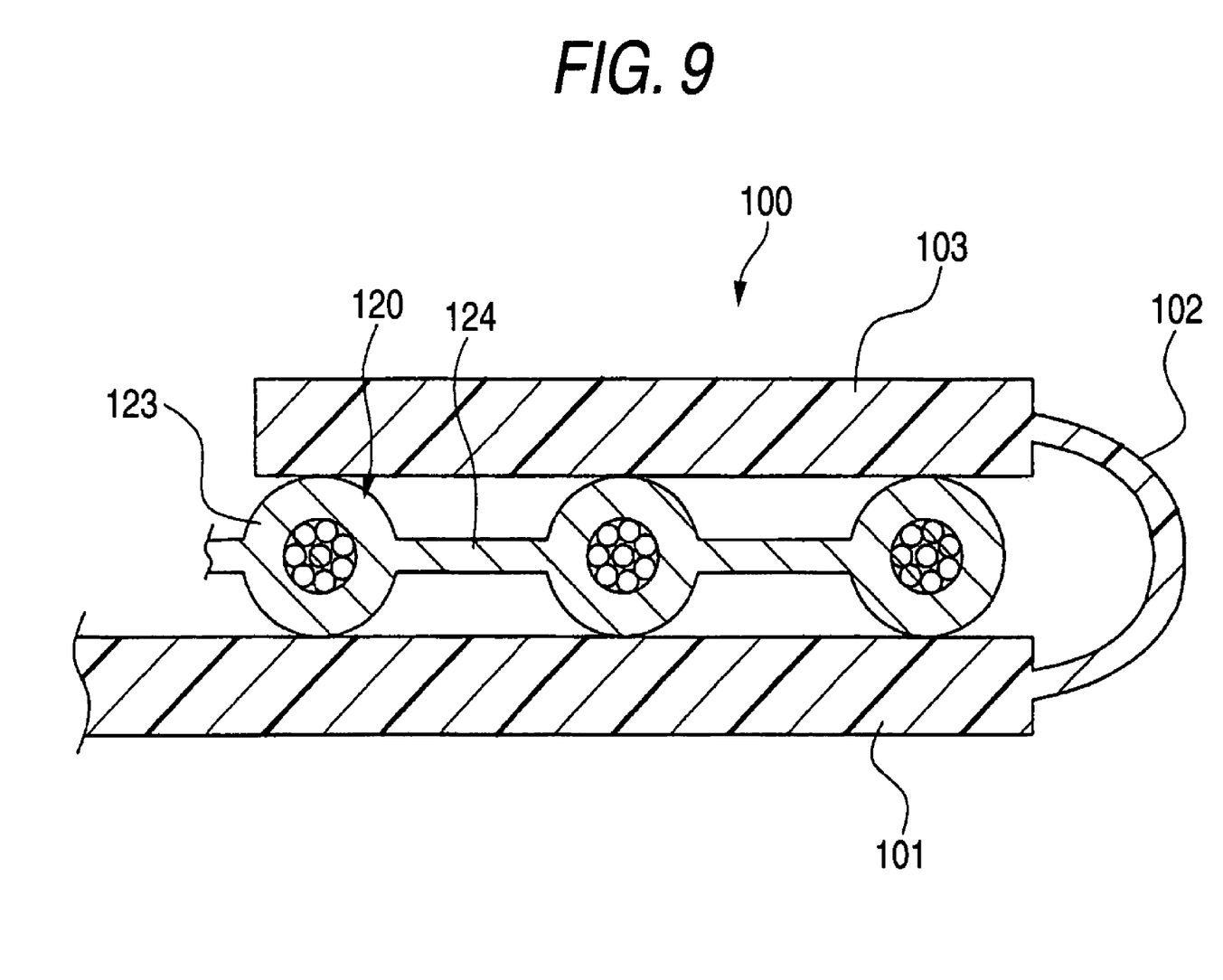
FIG. 9 is a cross sectional view (schematic cross sectional view) vied from IX-IX arrow of FIG. 8.

Now, at this moment, in order to explain further superiority of the present invention, a reference example is shown in FIGS. 6 through 9. FIG. 6 is an external appearance perspective view which shows the reference example of a flat cable clamp in such a situation that its clamp main body and covers are expanded, and FIG. 7 is an external appearance perspective view of a flat cable which is clamped down by the flat cable clamp of FIG. 6, and FIG. 8 is an external appearance perspective view which shows such a situation that the flat cable of FIG. 7 is clamped down by the reference example of the flat cable clamp of FIG. 6, and FIG. 9 is a cross sectional view viewed from IX-IX arrow (schematic cross sectional view) of FIG. 8

As shown in FIG. 6, in a flat cable clamp 100, 2 pieces of covers 103, 103 are coupled through 2 pieces of thin-walled hinges 102, 102 to a clamp main body 101.

To this flat cable 100, as shown in FIG. 7, a flat cable 120, which has slit-shaped positioning cutouts 121 of bridge portions 124 integrally formed with insulation outer skins of a plurality of electric wire portions 123, so as to couple the plurality of electric wire portions 123, is fixed. Positioning protrusions of the clamp main body 101 are inserted into these positioning cutouts 121 of the bridge portions 124.

As shown in FIG. 8, in the flat cable clamp 100, the flat cable 120 is placed on the clamp main body 101, and thereafter, 2 pieces of the covers 103, 103 are fit up to the clamp main body 101.

However, even in the suchlike flat cable clamp 100, as shown in FIG. 9, in order for the flat cable 120, which is disposed between a flat pressing surface of the cover 103 and a flat fixing surface of the clamp main body 101 (i.e., stands between flat surfaces), not to flip flop by excessive vibration to generate noises in case that the flat cable clamp 100 is mounted on a vehicle such as a car, there is need to reduce a gap between the flat cable 120 and the flat surface. However, by configuring in that manner, there is no choice to reduce an over-stroke of a locking mechanism, on the occasion that the clamp main body 101 is engaged with the covers 103, 103, and engagement of the clamp main body 101 and the covers 103, 103 becomes difficult.

In contrast to this, according to the flat cable clamp 10 of the present invention as shown in FIGS. 1 through 5, as described above, it is possible to easily carry out a mutual engagement operation of members for clamping down the flat cable 60 over protecting flip-flop (i.e., unstable fixing) of the flat cable 60 which is clamped down.

Meanwhile, the present invention is not limited to the above-described embodiments, but modification, improvement etc. are possible arbitrarily. In addition to that, material quality, shape, dimension, numerical value, configuration, number, location place, etc. of each constituent element are arbitrary and not limited, if they are things which can accomplish the present invention.

What is claimed is:

1. A flat cable clamp for fixing a flat cable equipped with at least two pieces of electric wire portions having a conductor portion and insulation outer skins for covering an outer peripheral surface of the conductor portion, and a bridge portion integrally formed on the insulation outer skins so as to connect between the electric wire portions, the flat cable clamp comprising:
    a clamp main body;
    a plurality of covers, each cover being operable to be engaged with the clamp main body so as to clamp down the flat cable between the plurality of covers and the clamp main body;
    a plurality of locking mechanisms, each mechanism disposed between the clamp main body and each of the covers so as to maintain an engagement situation between the clamp main body and the plurality of covers; and
    at least one protrusion, formed on an inner surface of one of the clamp main body and the plurality of covers so as to hold down the flat cable to an inner surface of the other of the clamp main body and the plurality of covers and press the bridge portion so that the bridge portion is bend toward the inner surface of the other in case that the clamp main body is engaged with the plurality of covers.

2. The flat cable clamp according to claim 1, wherein:
    the flat cable clamp fixes the flat cable to a body to be mounted; and
    the clamp main body includes a locking portion which is operable to be fitted in and attached to the body to be mounted.

3. The flat cable clamp according to claim 1, wherein:
    a refuge space is formed between the inner surface of the other of the clamp main body and each of the covers, and the bridge portion, so as to allow bending of the bridge portion.

4. The flat cable clamp according to claim 1, wherein:
    each of the plurality of locking mechanisms has a first catching surface formed on one of the clamp main body and the plurality of covers, and a second catching surface formed on the other of the clamp main body and the plurality of covers and to be caught by the first catching surface; and
    an over-stroke between each of the first catching surfaces and each of the second catching surfaces is equivalent to a distance that a forefront surface of the at least one protrusion moves toward an inner surface of the other of the clamp main body and the plurality of covers, in case that each of the first catching surface and each of the second catching surface catch each other and the clamp main body and the plurality of covers are pressed in a direction of clamping down the flat cable.

* * * * *